United States Patent

Nielsen et al.

[11] Patent Number: 6,055,542
[45] Date of Patent: Apr. 25, 2000

[54] SYSTEM AND METHOD FOR DISPLAYING THE CONTENTS OF A WEB PAGE BASED ON A USER'S INTERESTS

[75] Inventors: Christopher Robbins Nielsen; Ricky Lee Poston; Stephen Gray Stair; I-Hsing Tsao, all of Austin, Tex.

[73] Assignee: International Business Machines Corporation, Armonk, N.Y.

[21] Appl. No.: 08/960,141

[22] Filed: Oct. 29, 1997

[51] Int. Cl.[7] .................................................. G06F 17/30
[52] U.S. Cl. .............................. 707/104; 707/6; 707/10; 707/203
[58] Field of Search .................................. 707/6, 10, 104, 707/203; 345/329, 327; 395/200.54, 701

[56] References Cited

U.S. PATENT DOCUMENTS

| | | | |
|---|---|---|---|
| 5,761,662 | 6/1998 | Dasan | 707/10 |
| 5,796,393 | 8/1998 | MacNaughton et al. | 345/329 |
| 5,796,952 | 8/1998 | Davis et al. | 395/200.54 |
| 5,835,087 | 11/1998 | Herz et al. | 345/327 |
| 5,848,396 | 12/1998 | Gerace | 705/10 |
| 5,890,152 | 3/1999 | Rapaport et al. | 707/6 |
| 5,907,704 | 5/1999 | Gudmundson et al. | 395/701 |
| 5,913,215 | 6/1999 | Rubinstein et al. | 707/10 |
| 5,933,827 | 8/1999 | Cole et al. | 707/10 |

*Primary Examiner*—Wayne Amsbury
*Assistant Examiner*—Thuy Pardo
*Attorney, Agent, or Firm*—Leslie A. Van Leeuwen; Thomas E. Tyson

[57] ABSTRACT

The present invention is a system and method for finding information of interest within a particular Web page. A user creates an interest profile, which is stored with the user's browser. An interest profile may be as simple as a list of key words, or may be more complex, including data such as relative importance weights and boolean expressions. Once an interest profile is created, it may be used on any Web page to sort the information on the page according to the user s interests. Information may be sorted by line, paragraph, section, or any other defined scope. Once sorted, the information is displayed to the user as a series of links to the actual points of interest within the original page.

33 Claims, 5 Drawing Sheets

FIG. 6

Browser

File    Edit    View    Go    Bookmarks    Options    Dir    Help

| Back | Forward | Home | Reload | Print |

Location: http://sample.com/

Sample Page
Arranged by Interest

| Relevance | Line |          |          |          |          |
|-----------|------|----------|----------|----------|----------|
| 98        | Line 30  | Line 30  | Line 30  | Line 30  | Line 30  |
| 85        | Line 63  | Line 63  | Line 63  | Line 63  | Line 63  |
| 50        | Line 250 | Line 250 | Line 250 | Line 250 | Line 250 |
| 44        | Line 6   | Line 6   | Line 6   | Line 6   | Line 6   |

SYSTEM AND METHOD FOR DISPLAYING THE CONTENTS OF A WEB PAGE BASED ON A USER'S INTERESTS

FIELD OF THE INVENTION

The present invention relates to the field of information handling systems, and, more particularly, to a system and method for displaying the contents of a Web page based on a user interest profile.

BACKGROUND OF THE INVENTION

The World Wide Web is the Internet's multimedia information retrieval system. In the Web environment, client machines communicate with Web servers using the Hypertext Transfer Protocol (HTTP). HTTP is an application protocol providing users access to files (e.g., text, graphics, images, animation, sound, video, etc.) using a standard page description language known as Hypertext Markup Language (HTML). HTML provides basic document formatting and allows a developer to specify "links" to other servers and files. In the Internet paradigm, a network path to a server is identified by a Uniform Resource Locator (URL) having a specified syntax for defining a network connection. Use of an HTML-compatible browser (e.g., Netscape Navigator or Microsoft Internet Explorer) at a client machine involves specification of a link via the URL. In response, the client makes a request to the server identified in the link and receives in return a document formatted according to HTML.

A user may visit (i.e. browse) many Web pages looking for material which interests him. Often, a user will use a search engine (e.g., AltaVista, WebCrawler, etc.) to find Web pages of interest. Search engines utilize key words found in a Web page's abstract or HTML. The user is typically presented with a list of links to Web pages matching the search criteria.

Once a user finds a particular Web page, the user must often search through the entire Web page itself to find specific information. If a Web page is simple and short, this is a relatively easy task. However, many Web pages are long and complex, and it may take quite a bit of time for a user to browse through an entire Web page to find the information in which he is interested. Some Web pages contain a table of contents, which may help direct the user to a certain section within the Web page. However, there is currently no method available which will take a user directly to a point of interest within a Web page.

Consequently, it would be desirable to have a system and method for locating specific points of interest within a Web page, and for allowing the user to immediately view the points of interest without having to search the entire Web page. It would also be desirable if a user could specify one or more areas of interest, which could be used to help locate the specific points of interest within a Web page.

SUMMARY OF THE INVENTION

Accordingly, the present invention is directed to a system and method for finding information of interest within a particular Web page. A user creates an interest profile, which is stored with the user's browser. An interest profile may be as simple as a list of key words, or may be more complex, including additional data, such as boolean relationships (i.e. AND, NOT, OR, etc.) and relative importance (i.e. weights). Once an interest profile is created, it may be used on any Web page to sort the information on the page according to the user's interests. Information may be sorted by line, paragraph, section, or any other defined scope. Once sorted, the information is displayed to the user as a series of links to the actual points of interest within the original page.

The method of the present invention may be implemented in an information handling system which includes one or more processors, an operating system, and a browser. Another aspect of the invention is as sets of instructions resident in an information handling system.

One advantage of the present invention is that a user may view the points of interest in a Web page without having to read or skim the entire Web page. Another advantage of the present invention is that the user can specify one or more areas of interest, which are then used to locate the specific points of interest within a Web page. A further advantage of the present invention is that the points of interest are sorted according to relevancy (i.e. user interest), and are presented as hypertext links into the original Web page, thus allowing the user to quickly spot the areas of interest within a document and move to a desired point of interest within the Web page.

BRIEF DESCRIPTION OF THE DRAWINGS

The foregoing and other features and advantages of the present invention will become more apparent from the detailed description of the best mode for carrying out the invention as rendered below. In the description to follow, reference will be made to the accompanying drawings, where like reference numerals are used to identify like parts in the various views and in which:

FIG. 6 is an illustration of the Web page after it is rearranged according to the user's interest profile.

DETAILED DESCRIPTION OF A PREFERRED EMBODIMENT OF THE INVENTION

Figure 1:
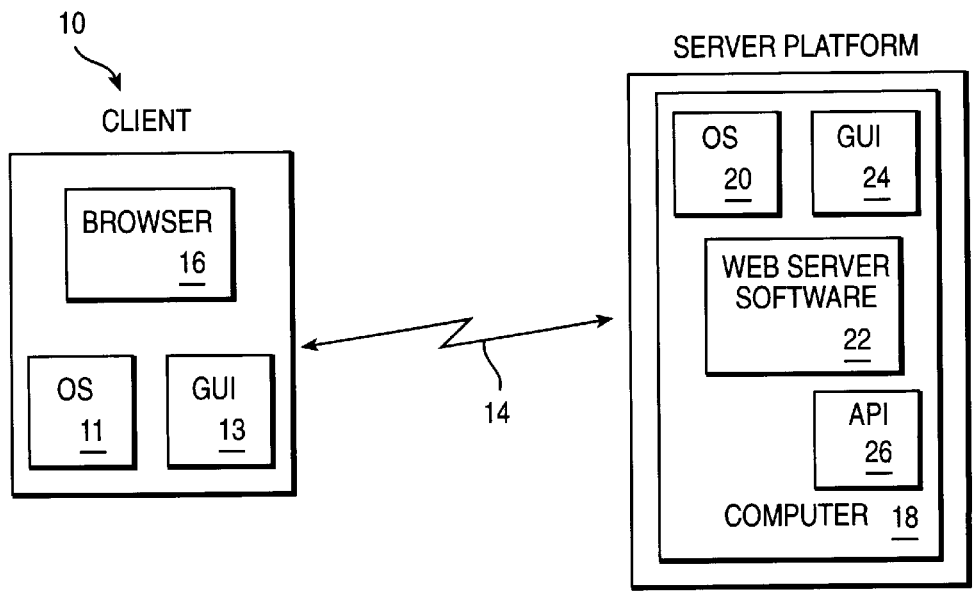
FIG. 1 is a block diagram of an information handling system implementing the present invention.

A representative system in which the present invention is implemented is illustrated in FIG. 1. A client machine 10 is connected to a Web server platform 12 via a communication channel 14. For illustrative purposes, channel 14 is the Internet, an intranet or other known network connection. Web server platform 12 is one of a plurality of servers which are accessible by clients, one such client being illustrated by machine 10. A representative client machine includes an operating system 11, a graphical user interface 13, and a browser 16. A browser is a known software tool used to access the servers of a network, such as the Internet. Representative browsers include, among others, Netscape Navigator, Microsoft Internet Explorer or the like, each of which are "off-the-shelf" or downloadable software programs. The Web server platform (sometimes referred to as a "Web" site) supports files in the form of hypertext documents and objects. In the Internet paradigm, a network path to a server is identified by a Uniform Resource Locator (URL). The World Wide Web is the Internet's multimedia information retrieval system. In particular, it is a collection of servers of the Internet that use the Hypertext Transfer Protocol (HTTP), which provides users access to files using Hypertext Markup Language (HTML).

A representative Web Server platform 12 comprises an IBM RISC System/6000 computer 18 running the AIX (Advanced Interactive Executive) Operating System 20 and a Web server program 22, such as Netscape Enterprise Server Version 2.0, that supports interface extensions. The platform 12 also includes a graphical user interface (GUI) 24 for management and administration. The various models of the RISC-based computers are described in many publications of the IBM Corporation, for example, RISC System 6000, 7013 and 7016 POWERstation and POWERserver Hardware Technical Reference, Order No. SA23-2644-00. AIX OS is described in AIX Operating System Technical Reference, published by IBM Corporation, First Edition (November 1985), and other publications. While the above platform is useful, any other suitable hardware/operating system/Web server combinations may be used.

Figure 2:
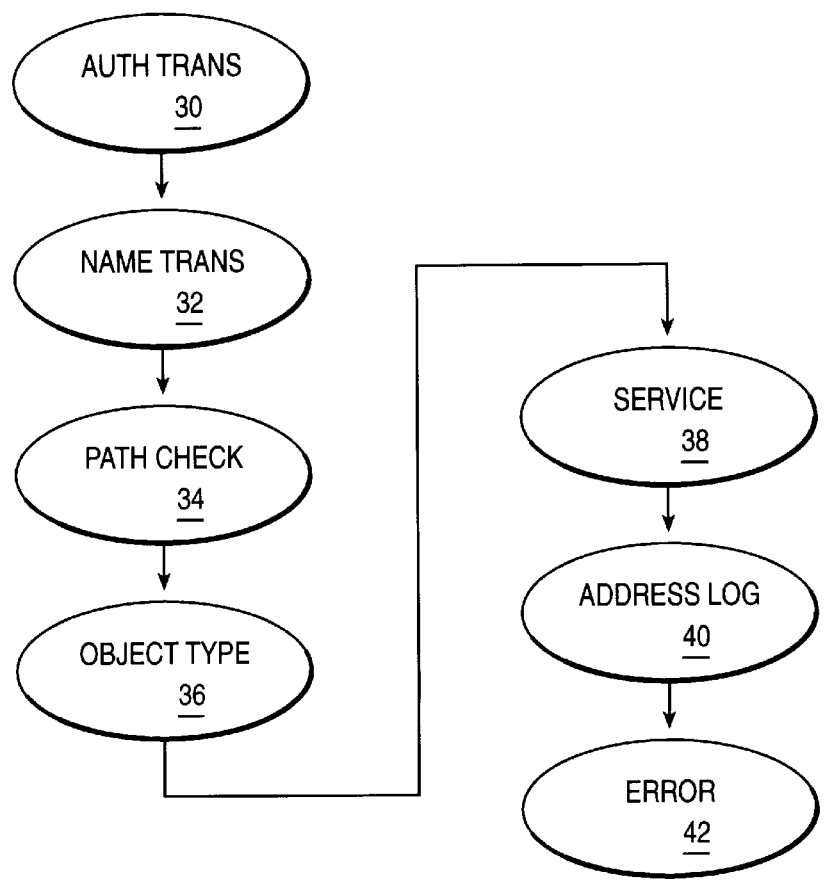
FIG. 2 is a flowchart illustrating the conventional processing associated with an HTTP request from a Web client to a Web server.

The Web Server accepts a client request and returns a response. The operation of the server program 22 is governed by a number of server application functions (SAFs), each of which is configured to execute in a certain step of a sequence. This sequence, illustrated in FIG. 2, begins with authorization translation (step 30), during which the server translates any authorization information sent by the client into a user and a group. If necessary, the authorization translation step may decode a message to get the actual client request. During name translation (step 32), the URL associated with the request may be kept intact or it can be translated into a system-dependent file name, a redirection URL or a mirror site URL. Next, path checks are performed (step 34), during which the server performs various tests on the resulting path to ensure that the given client may retrieve the document. During the object types step (step 36), MIME (Multipurpose Internet Mail Extension) type information (e.g., text/html, image/gif, etc.) for the given document is identified. During the service step (step 38), the Web server routine selects an internal server function to send the result back to the client. This function can run the normal server service routine (to return a file), some other server function (such as a program to return a custom document) or a CGI program. Information about the transaction is recorded at the address log step (step 40). If an error has been encountered at any step along the way, the server responds to the client when it encounters the error (step 42). Further details of these operations may be found in the Netscape *Web Server Programmer's Guide*, Chapter 5, which is incorporated herein by reference.

Thus, the Web server 18 includes a known set of server application functions (SAFs). These functions take the client's request and other configuration data of the server as input and return a response to the client as output. Referring back to FIG. 1, the Web server 18 also includes an Application Programming Interface (API) 26 that provides extensions to enable application developers to extend and/or customize the core functionality thereof (namely, the SAFs) through software programs commonly referred to as "plug-ins."

Many times a user (i.e. client 10) uses a search operation to search the Web to find Web pages of interest. There are a variety of Web search engines available, such as AltaVista and WebCrawler. In response to a user search request, most search engines return a list of Web pages which may contain data of interest to the user. The user then views selected pages with the hope of finding particular data or information.

Prior art search engines are often inadequate. For example, a user may have many different interests, requiring a complex search which is beyond the capability of most search engines. In addition, it would be tedious for a user to have to input a very large set of interests each time the user wanted to perform a search.

Another problem not solved by prior art search techniques is that many Web pages are very long and complex, and it is not immediately obvious to a user where particular information may be present on a Web page. The present invention assists a user in finding information of interest within a particular Web page. The user creates an interest profile, which is stored with the user's browser. Once an interest profile is created, it may be used on any Web page to sort the information on the page according to the user's interests. Information may be sorted by line, paragraph, section, or any other defined scope. Once sorted, the information is displayed to the user as a series of links to the actual points of interest within the original page.

Figure 3:
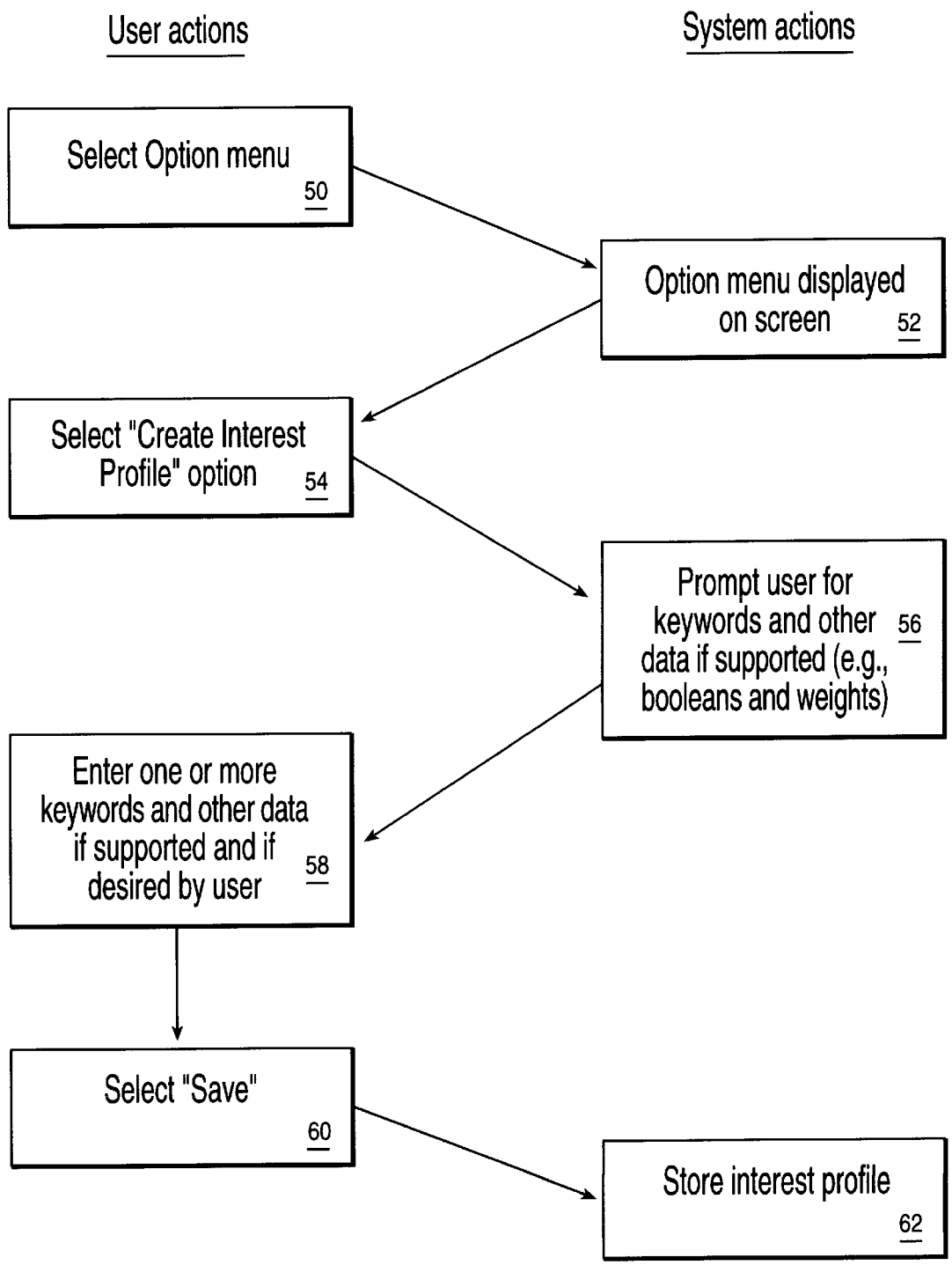
FIG. 3 is a flowchart depicting a method of creating an interest profile according to the teachings of the present invention.

Referring now to FIG. 3, a method for creating an interest profile will now be described. The user first selects an option menu (step 50). The option menu may be selected in a variety of ways, such as by clicking on an "option" button, or by clicking the alternate mouse button. An option menu is then displayed by the browser (step 52). The option menu may contain many option choices, including a choice for creating an interest profile. The user selects the "create interest profile" choice (step 54). The browser prompts the user for key words, and any other necessary data (step 56). Note that the interest profile may be as simple as a list of key words, or may be more complex. For example, in step 56, the user may rank the key words, or assign a relative importance weight or priority to each key word. The user may also connect two or more key words through the use of boolean expressions. For example, the user may type in the expression "Cat AND Dog" or the expression "Pet AND NOT Cat." The user enters the appropriate data (step 58), and then saves the interest profile (step 60). The browser stores the interest profile for later use (step 62).

Although FIG. 3 describes the steps necessary for creating and storing a single interest profile, it is possible to create and store several interest profiles. For example, a user may have several different interest profiles, each relating to a different hobby.

After creating an interest profile, the user may use it whenever he is viewing a Web page. For example, assume the user is viewing a Web page, hoping to find data regarding a particular interest. However, the Web page is long and complex, and it is not immediately apparent to the user exactly where the desired information is located on the Web page. At this point, the user may use one of his interest profiles to help locate the information that will be most useful to him.

Figure 4:
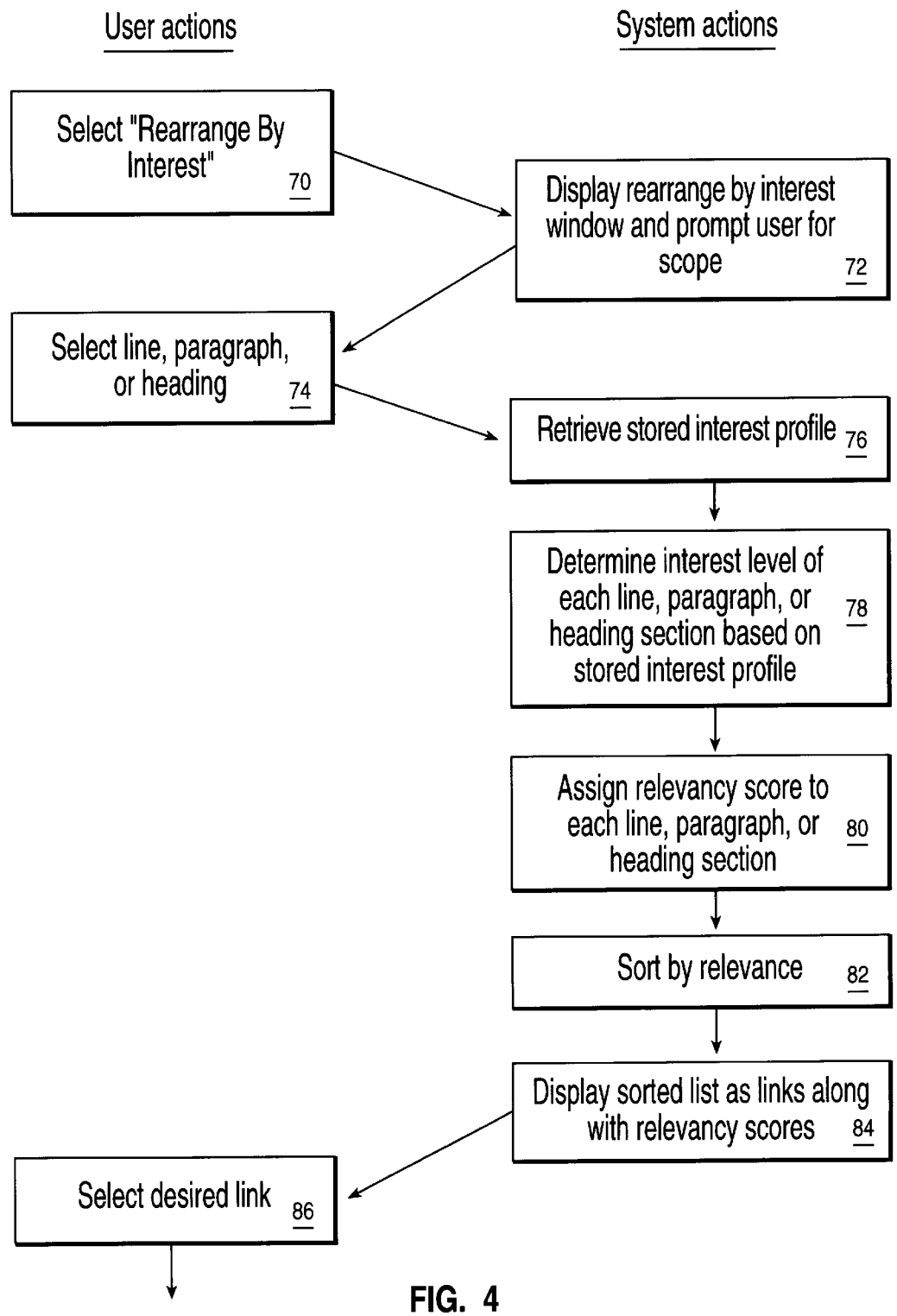
FIG. 4 is a flowchart depicting a method of rearranging a Web page based on the interest profile created in FIG. 3.

Referring now to FIG. 4, a method of using an interest profile to rearrange a Web page will now be described. The user first chooses a "rearrange by interests" option (step 70). The user may choose this option in any of a variety of ways (e.g., selecting it from an option pull-down menu or from a labeled button in the browser). A rearrange by interest menu is then displayed to the user (step 72), and the user selects the scope for the text sorting (step 74). The scope determines the granularity of the search. It may be defined as narrowly or broadly as the user desires. In the described embodiment, the user is given three choices for scope—line, paragraph, or headings (i.e. between headings in the Web page). The user may make a scope selection in any one of a number of ways.

For example, there may be a cascade menu off the rearrange by interest menu, which allows the user to make a scope selection.

The browser then retrieves the stored interest profile (step 76). Of course, if there is more than one interest profile, the browser will prompt the user to choose the desired interest profile. The browser then applies the interest profile to each section (i.e. line, paragraph, or between headings) (step 78). The browser assigns a relevancy score to each section (step 80) based on how well the section of text matches the user's interest profile. If the interest profile is simply a list of key words, the relevancy score may be based on the number of key words contained in the section. One skilled in the art will appreciate that if the interest profile is more complex (i.e. contains relative importance weights or boolean expressions), then the relevancy assignment will be more complex.

The lines, paragraphs, or headings are then sorted by relevancy (step 82), and displayed (step 84). Each line, paragraph, or heading is displayed in order of relevance, from highest to lowest, along with its appropriate relevance ranking. Each line, paragraph, or heading is also a link to the original position of the text section in the original document. This allows the user to scan the sorted list and select a desired link (step 86). In this way, the user locates information of interest within the Web page.

Figure 5:
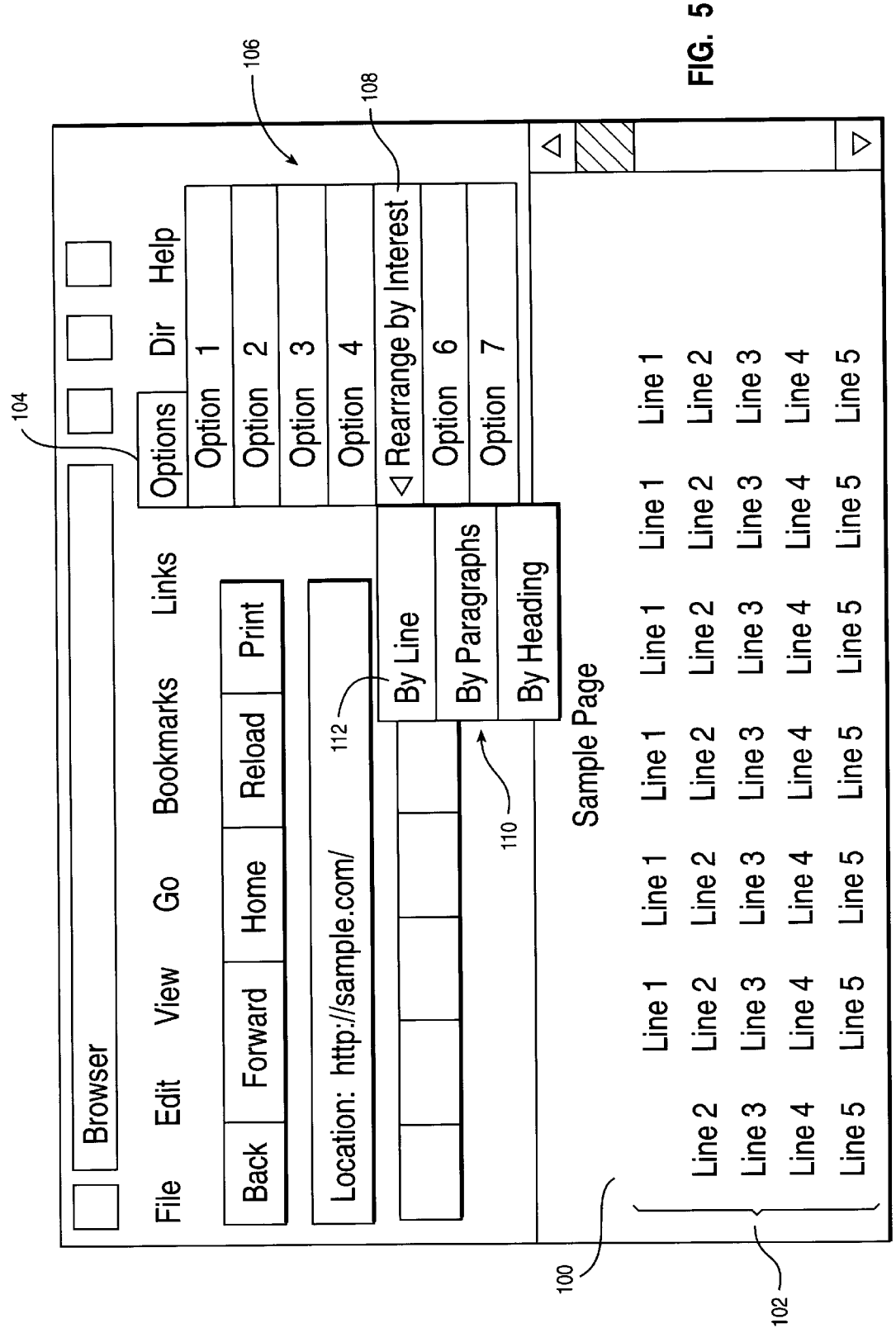
FIG. 5 is an illustration of a typical Web page before it is rearranged according to a user's interest profile.

FIGS. 5 and 6 depict an example of using the present invention to locate desired information in a Web page. For illustrative purposes only, assume that the user has created and stored an interest profile, and now wishes to use the interest profile to locate particular information. Further assume that the user is currently viewing Web page 100, containing lines of data 102, as depicted in FIG. 5. The user selects option button 104 to display a pull-down menu 106. The user selects option 108, "rearrange by interest," and is then prompted to select a desired scope from box 110. The user chooses "line" 112 as his desired scope.

The browser then assigns a relevancy score to each line in the Web page and displays the results as shown in FIG. 8. Note that each line includes a relevancy score, and further, that each line is a link into the original page. For example, "Line 30" is the most relevant line in the Web page, and is displayed first, along with its relevancy rating of 98.

Although the invention has been described with a certain degree of particularity, it should be recognized that elements thereof may be altered by persons skilled in the art without departing from the spirit and scope of the invention. One of the embodiments of the invention can be implemented as sets of instructions resident in the random access memory of one or more computer systems configured generally as described in FIG. 1. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. A method for displaying a Web page in a client having a browser, the client connected to a plurality of servers in a computer network, comprising the steps of:

partitioning data contained on the Web page into a plurality of data sections;

calculating a relevancy rating for each data section; and displaying the data sections in an order based on the calculated relevancy ratings.

2. A method according to claim 1, wherein said partitioning step comprises the steps of:

prompting a user to choose a partitioning scope from a plurality of possible partitioning scope choices; and partitioning the data into a plurality of data sections according to the partitioning scope chosen by the user.

3. A method according to claim 1, wherein a data section comprises one or more lines of data.

4. A method according to claim 1, wherein a data section comprises one or more paragraphs of data.

5. A method according to claim 1, wherein said calculating step comprises the step of:

retrieving a user interest profile, wherein the user interest profile contains one or more interests specified by a user; and calculating a relevancy rating for each data section based on a correspondence between the data section and the user interest profile.

6. A method according to claim 1, wherein said displaying step further comprises the step of sorting the data sections based on the calculated relevancy ratings.

7. A method according to claim 1, wherein said displaying step further comprises the step of displaying each data section along with its associated relevancy rating.

8. A method according to claim 1, wherein said displaying step further comprises the step of displaying each data section as a hypertext link to a point in the Web page where the data section is found.

9. A method according to claim 1, further comprising the step of creating a user interest profile.

10. A method according to claim 9, wherein said creating step comprises the steps of:

prompting a user for one or more key words of interest; and saving the key words of interest as the user interest profile.

11. A method according to claim 10, further comprising the steps of:

prompting the user for an associated priority for each key word of interest; and saving the key words of interest along with their associated priorities as the user interest profile.

12. An information handling system, comprising:

one or more processors;

an operating system for controlling operation of the processors;

a browser;

page display means, operative in conjunction with the browser, for displaying a Web page;

means for partitioning data contained on the Web page into a plurality of data sections;

means for calculating a relevancy rating for each data section; and means for displaying the data sections in an order based on the calculated relevancy ratings.

13. An information handling system according to claim 12, wherein said means for partitioning comprises:

means for prompting a user to choose a partitioning scope from a plurality of possible partitioning scope choices; and means for partitioning the data into a plurality of data sections according to the partitioning scope chosen by the user.

14. An information handling system according to claim 12, wherein a data section comprises one or more lines of data.

15. An information handling system according to claim 12, wherein a data section comprises one or more paragraphs of data.

16. An information handling system according to claim 12, wherein said means for calculating comprises:

means for retrieving a user interest profile, wherein the user interest profile contains one or more interests specified by a user; and means for calculating a relevancy rating for each data section based on a correspondence between the data section and the user interest profile.

17. An information handling system according to claim 12, wherein said means for displaying further comprises means for sorting the data sections based on the calculated relevancy ratings.

18. An information handling system according to claim 12, wherein said means for displaying further comprises means for displaying each data section along with its associated relevancy rating.

19. An information handling system according to claim 12, wherein said means for displaying further comprises means for displaying each data section as a hypertext link to a point in the Web page where the data section is found.

20. An information handling system according to claim 12, further comprising means for creating a user interest profile.

21. An information handling system according to claim 20, wherein said means for creating comprises:

means for prompting a user for one or more key words of interest; and means for saving the key words of interest as the user interest profile.

22. An information handling system according to claim 21, further comprising:

means for prompting the user for an associated priority for each key word of interest; and means for saving the key words of interest along with their associated priorities as the user interest profile.

23. A computer readable medium for controlling the display of a Web page in a client, comprising:

means for partitioning data contained on the Web page into a plurality of data sections;

means for calculating a relevancy rating for each data section; and means for displaying the data sections in an order based on the calculated relevancy ratings.

24. A computer readable medium according to claim 23, wherein said means for partitioning comprises:

means for prompting a user to choose a partitioning scope from a plurality of possible partitioning scope choices; and means for partitioning the data into a plurality of data sections according to the partitioning scope chosen by the user.

25. A computer readable medium according to claim 23, wherein a data section comprises one or more lines of data.

26. A computer readable medium according to claim 23, wherein a data section comprises one or more paragraphs of data.

27. A computer readable medium according to claim 23, wherein said means for calculating comprises:

means for retrieving a user interest profile, wherein the user interest profile contains one or more interests specified by a user; and means for calculating a relevancy rating for each data section based on a correspondence between the data section and the user interest profile.

28. A computer readable medium according to claim 23, wherein said means for displaying further comprises means for sorting the data sections based on the calculated relevancy ratings.

29. A computer readable medium according to claim 23, wherein said means for displaying further comprises means for displaying each data section along with its associated relevancy rating.

30. A computer readable medium according to claim 23, wherein said means for displaying further comprises means for displaying each data section as a hypertext link to a point in the Web page where the data section is found.

31. A computer readable medium according to claim 23, further comprising means for creating a user interest profile.

32. A computer readable medium according to claim 31, wherein said means for creating comprises:

means for prompting a user for one or more key words of interest; and means for saving the key words of interest as the user interest profile.

33. A computer readable medium according to claim 32, further comprising:

means for prompting the user for an associated priority for each key word of interest; and means for saving the key words of interest along with their associated priorities as the user interest profile.

* * * * *